United States Patent [19]

Jensen

[11] Patent Number: 5,340,896
[45] Date of Patent: Aug. 23, 1994

[54] THERMOSET POLYMERIC PRECURSORS FOR ALUMINUM NITRIDE

[76] Inventor: James A. Jensen, 544 Cabot Dr. Hickory Hills, Hockessin, Del. 19707

[21] Appl. No.: 148,727

[22] Filed: Nov. 8, 1993

Related U.S. Application Data

[63] Continuation of Ser. No. 829,818, Feb. 3, 1992, Pat. No. 5,260,397, which is a continuation-in-part of Ser. No. 594,754, Oct. 9, 1990, abandoned.

[51] Int. Cl.$^5$ .............................................. C08G 79/10
[52] U.S. Cl. ...................................... 528/9; 264/29.1; 423/412; 501/96; 524/610; 524/612; 528/271; 528/480; 528/481
[58] Field of Search .................. 528/9, 480, 481, 271; 264/29.1; 423/412; 501/96; 524/610, 612

[56] References Cited

U.S. PATENT DOCUMENTS

| | | | |
|---|---|---|---|
| 3,505,246 | 4/1970 | Ehrlich et al. | 260/2 |
| 4,687,657 | 8/1987 | Clark et al. | 423/412 |
| 4,696,968 | 9/1987 | Tebbe | 524/610 |
| 4,767,607 | 8/1988 | Schleich | 423/412 |
| 4,783,430 | 11/1988 | Su | 501/96 |
| 5,260,397 | 11/1993 | Jensen | 528/9 |

FOREIGN PATENT DOCUMENTS

| | | |
|---|---|---|
| 259164 | 3/1988 | European Pat. Off. |
| 331448 | 9/1989 | European Pat. Off. |

OTHER PUBLICATIONS

L. V. Interrante et al., Inorganic Chem., 1989, 28, 252–257 and J. Electrochem. Soc. 1989, 136, 472–478.
L. Maya, Adv. Ceram. Mat., 1986, 1, 150–153.
L. I. Zakharkin and I. M. Khorlina, Bull. Acad. Sci. USSR, Engl. Transl. 1959, 523–524 and Proc. Acad. Sci. USSR, 1957, 116, 879.
Jiang and Interrante, Chem. Mater., 2, pp. 439–446 (1990), "N,N'-Bis(triethylaluminio)ethylenediamine- and N,N'-Bis(trimethylaluminio)ethylene-diamine-Derived Organometallic Precursors to Aluminum Nitride Syntheses, Structures, and Pyrolyses".
Patent Abstracts of Japan, vol. 11, No. 53, Feb. 19, 1987, "Production of Organic Aluminum Nitride Polymer".
Chemical Abstracts, vol. 53, No. 22, Nov. 25, 1959, Abstract No. 21734:d–f, "Thermal Decomposition of Addition Products of Diisobutyl–aluminum Hydride and Nitriles".

Primary Examiner—Morton Foelak

[57] ABSTRACT

Aluminum-nitrogen polymers comprising a backbone of alternating aluminum and nitrogen atoms both having pendant organic groups, wherein some of the pendant organic groups are unsaturated, are prepared by reacting an unsaturated organic nitrile with a dialkylaluminum hydride. The polymers are crosslinked by supplying energy to generate free radicals. The crosslinked polymers can be pyrolyzed to form an aluminum nitride ceramic.

9 Claims, No Drawings

THERMOSET POLYMERIC PRECURSORS FOR ALUMINUM NITRIDE

This is a continuation of copending application Ser. No. 07/829,818 filed on Feb. 3, 1992 which issued on Nov. 9, 1993, as U.S. Pat. No. 5,260,397, which was a continuation-in-part of U.S. patent application Ser. No. 07/594,754, filed on Oct. 9, 1990, and now abandoned.

FIELD OF THE INVENTION

This invention relates to polymer precursors for aluminum nitride. This invention particularly relates to aluminum-nitrogen polymers having sites of organo-unsaturation that can be crosslinked by the application of heat.

BACKGROUND OF THE INVENTION

Aluminum nitride (AlN) is a refractory material melting at 2400° C, which exhibits several unique chemical and physical properties, e.g., it has a density of 3.26 g/cm$^3$, a Young's modulus of 280 GPa, a flexural strength of 400 MPa and a Knoop hardness of 1200 kg//mm$^2$. AlN is very stable in the presence of molten metals and therefore can be used, for example, for making crucibles to hold molten metal.

Aluminum nitride is also an electrical insulator with a bandgap of 6.2 electron volts, which makes it an attractive alternative substrate material to replace alumina and beryllia in electronic packaging. The thermal expansion coefficient of AlN is nearly identical to that of silicon. This is an important property in high power applications where thermal distortion can occur between a silicon chip and the substrate due to a mismatch in the coefficients of thermal expansion of the two materials. The thermal conductivity of aluminum nitride is nearly ten times higher than alumina and approximately equal to that of beryllia. Unlike beryllia, aluminum nitride is not restricted by processing constraints because of its toxicity.

There is currently a great deal of interest in polymer precursor materials that can be pyrolyzed to yield ceramic materials, including aluminum nitride. Aluminum-nitrogen polymers containing no alkyl substitution on the aluminum or nitrogen atoms are described in U.S. Pat. No. 4,767,607, in which thermolysis of a mixture of aluminum chloride and hexamethyldisilazane results in formation of a polymer with the repeating unit [(Cl)Al—N(H)]$_n$. Pyrolysis of the polymer in ammonia or under vacuum yields crystalline AlN. An infusible polymeric aluminum amidimide [(NH$_2$)Al—N(H)]$_n$ that can be pyrolyzed to form AlN is described by L. Maya, Adv. Ceram. Mat., 1986, 1, 150–153.

Polymers having the repeating unit [(R)Al—N(H)]$_n$ are disclosed in U.S. Pat. No. 4,696,968 and European Patent Application 259,164. Fibers can be melt spun from the thermoplastic precursor and pyrolyzed to AlN. L. V. Interrante et al., Inorganic Chem 1989, 28, 252–257 and Mater. Res. Soc. Symp. Proc., 1986, 73, 359–366 reported the formation of volatile crystalline precursors that can be sublimed under vacuum. A two step pyrolysis of these precursors in ammonia resulted first in an insoluble aluminum imide polymer of the form [(R)Al—N(H)]$_n$ and ultimately AlN containing less than 0.5% residual carbon and oxygen. U. S. Pat. No. 4,783,430 discloses the formation of [(CH$_3$)Al—N(H)]$_n$, which can be pyrolyzed under helium, argon or vacuum to form hexagonal AlN.

Polymers having the repeating unit [(H)Al—N(R)]$_n$ are disclosed in U.S. Pat. No. 3,505,246 and are formed by the reaction of the alane adduct H$_3$Al←N(C$_2$H$_5$)$_3$ with a reagent such as acetonitrile. U.S. Pat. No. 4,687,657 discloses the preparation of a poly-N-alkyliminoalane that can be pyrolyzed in argon or under vacuum to form AlN.

Reacting an organic nitrile with diisobutylaluminum hydride produced organoaluminum imines having the formula RCH=NAl(i-C$_4$H$_9$)$_2$, which were not isolated (L. I . Zakharkin and I. M. Khorlina, Bull. Acad. Sci. USSR, Engl. Transl., 1959, 523–524 and Proc. Acad. Sci. USSR, 1957, 112, 879). A gas containing 85% isobutene and polymers having the repeating unit [Al—N(R)]$_n$ were produced on heating the organoaluminum imine to 220° to 240° C. During the formation of the polymer, aluminum alkyl groups of the organoaluminum imine are eliminated as isobutene, and aluminum-nitrogen bonds are formed.

European Patent Application 331,448 discloses that AlN can be deposited on a substrate by heating the substrate and contacting it with the vapor of an aluminum-nitrogen compound having the formula CH$_3$(R$^1$)Al—N(R$^2$)(C$_3$H$_7$), where R$^1$ is alkyl and R$^2$ is H, alkyl or aryl. A polymer of this compound is claimed, but the structure of the polymer is not disclosed.

SUMMARY OF THE INVENTION

The polymers of this invention comprise a backbone of alternating aluminum and nitrogen atoms both having pendant organic groups, at least some of the pendant organic groups being unsaturated.

Also according to the invention, the aluminum-nitrogen polymers are prepared by reacting a dialkylaluminum hydride with an unsaturated nitrile. The unsaturated aluminum-nitrogen polymers can be crosslinked by supplying energy to generate free radicals. The crosslinked polymers can be pyrolyzed to form an aluminum nitride-containing ceramic.

DETAILED DESCRIPTION OF THE INVENTION

The aluminum-nitrogen polymers are prepared by (a) reacting an unsaturated organic nitrile having the formula RCN, where R is a 2-12 carbon alkenyl or alkynyl group, with a dialkylaluminum hydride having the formula R'R"AlH, where R' and R" are the same or different 1-12 carbon alkyl groups, to form an organoaluminum imine and (b) heating the organoaluminum imine to a temperature of from about 50° C. to about 400° C. Uncatalyzed crosslinking of the pendant unsaturated organic groups will occur above temperatures of about 180° C . It is therefore preferable to heat the organoaluminum imine below this temperature if an uncured polymer is desired.

A single unsaturated nitrile, a mixture of unsaturated nitriles or a mixture of saturated and unsaturated nitriles can be used to prepare the aluminum-nitrogen polymers of this invention. Suitable unsaturated nitriles include, for example, acrylonitrile, methacrylonitrile, 3-butenenitrile, crotonitrile, 1-cyclohexenylacetonitrile, 1-cyclopentenylacetonitrile, 5-cyano-1-pentyne, cinnamonitrile, 1,4-dicyano-2-butene and 5-norbornene-2-carbonitrile.

The organoaluminum imine formed by the reaction of the organic nitrile and the dialkylaluminum hydride is typically a dimer that contains a heterocyclic core and has the structure

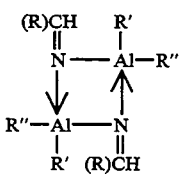

Depending on the nature of the substituents R, R' and R", the imine can also be in the form of a monomer or a higher cyclic oligomer. The exact form of the imine is dictated by the steric and electronic properties of the substituents.

In the reactions described below, the notation for labeling the carbon atoms bonded to Al atoms will be the following:

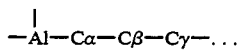

Likewise, a hydrogen atom bonded to a $C\alpha$ carbon atom will be called an $\alpha$-hydrogen atom.

The following units comprise the major components of the polymer, although small amounts of other components can also be present:

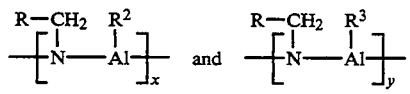

where R has the same meaning as described above. $R^2$ is an unreacted alkyl group R' or R" on aluminum, introduced as part of the dialkylaluminum hydride. $R^3$ is an organic group derived from $R^2$ in the process of heating the organoaluminum imine, e.g., the formation of isobutenyl groups from isobutyl groups in Path A of the reaction scheme illustrated below. The values of x and y depend upon the time of heating, the temperature of heating, and the structure of the aluminum hydride reactant used. The heating can be carried out with or without a solvent, although it is preferably carried out without a solvent.

While not wishing to be bound by theory, the process of gas evolution in systems containing a $\beta$-hydrogen atom on one of the organic groups bonded to aluminum is believed to proceed by the following mechanism, using a diisobutylaluminum imine as an example:

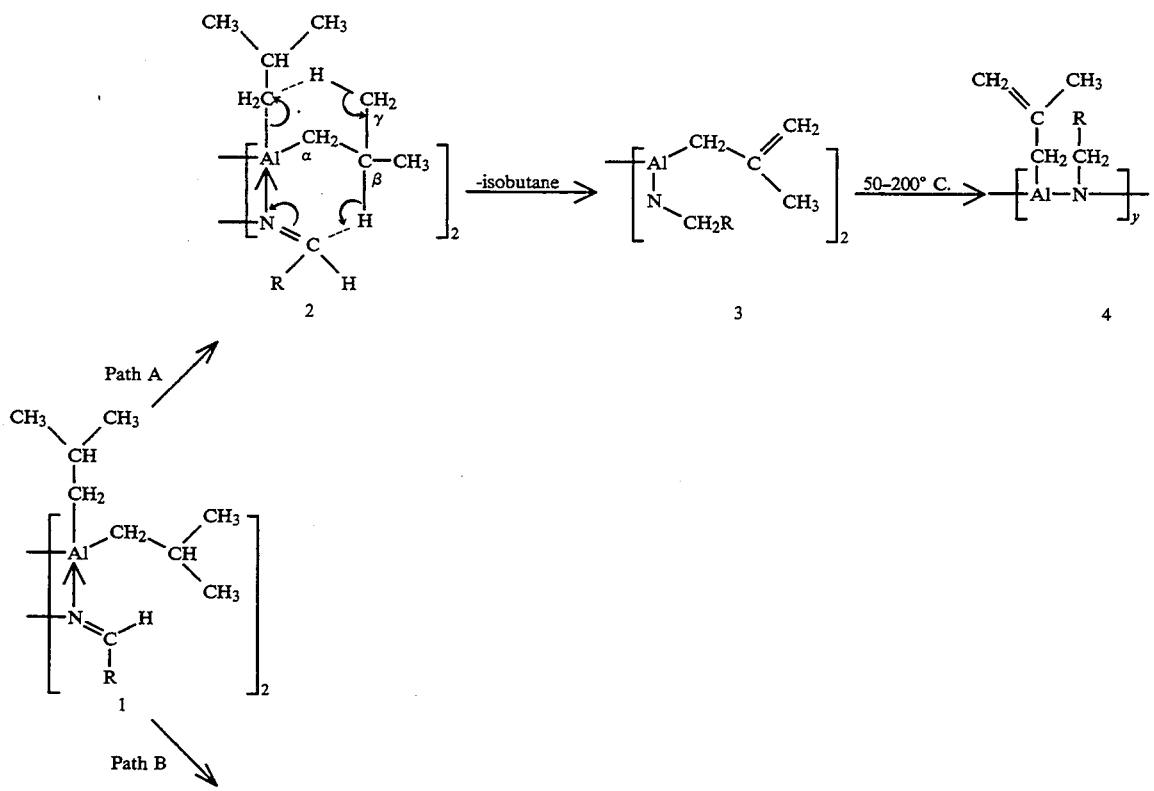

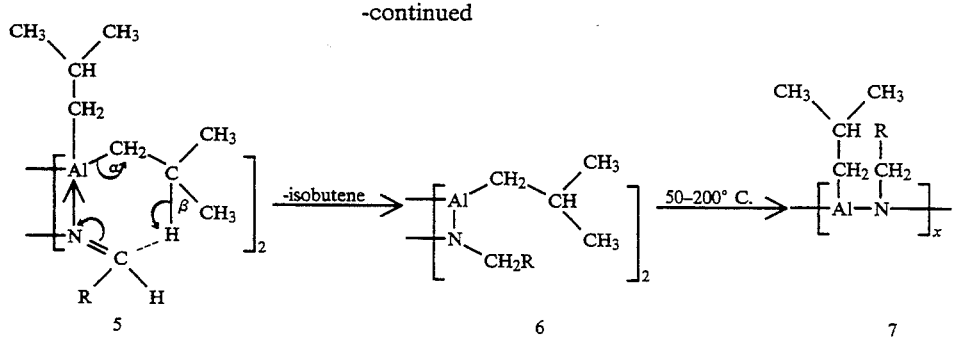

In this mechanism the coordinated imine in the starting dimer (1) is reduced in the process of β-hydride migration from a neighboring isobutyl group as shown in intermediate (2) in Path A. The imine reduction is accompanied by transfer of an acidic γ-hydrogen from the isobutyl group involved in imine reduction to the other aluminum-bonded isobutyl group. Six membered ring intermediates appear to be involved. Loss of alkane results in an isobutenyl intermediate (3). Thermal polymerization to give polymer (4) then occurs. In the case of diisobutylaluminum hydride, the butenyl groups formed as a result of the elimination reaction shown in Path A further react to give $C_8$ alkyl groups and higher. This reaction is confirmed by polymer hydrolysis/gas chromatography-mass spectrometric studies, which detect isobutylene and $C_8$ hydrocarbons as decomposition products of hydrolysis. In the case of methyl and ethyl substituents where no γ-hydrogen is present, it is presumed that α- or β-hydride transfer results in loss of alkane and formation of highly reactive intermediates that cannot be detected but that quickly react either intramolecularly or intermolecularly to give $R^3$ moieties.

Alternatively, β-hydride migration to reduce the coordinated imine can be accompanied by loss of alkene if Al-Cα bonds are broken in the process of β-hydride migration (5) (Path B).

The aluminum-nitrogen polymer can be further dissolved in aprotic organic solvents such as hexane, toluene, xylene, or diethyl ether and treated with ammonia or a primary amine, $R^4NH_2$, where $R^4$ is a 1–12 carbon alkyl, cycloalkyl, alkenyl, cycloalkenyl, alkynyl or aryl group, for a time sufficient to introduce HN- or $R^4$N- groups into the polymer by transamination with concomitant release of $RCH_2NH_2$ or by aluminum alkyl bond cleavage. The aluminum-nitrogen polymer can also be treated with a mixture of ammonia and a primary amine.

In the polymer produced upon treatment of the aluminum-nitrogen polymer with ammonia or a primary amine, at least some of the units comprise the following:

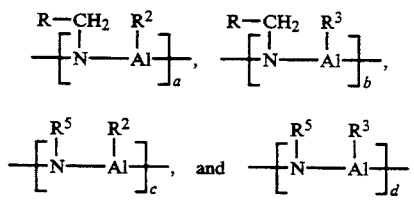

where R, $R^2$, and $R^3$ have the same meaning as described above. $R^5$ is either H or $R^4$. The values of a, b, c and d depend upon the original values of x and y as well as the amount of ammonia or primary amine added. Typically the aminated polymers are solids rather than viscous liquids and have a higher ceramic yield on pyrolysis compared to the non-aminated polymers.

The polymers of the present invention can be crosslinked by an energy input such as provided by heat. Other forms of energy input such as UV radiation, electron beam methods, microwave radiation, and anionic or cationic polymerization can also be used. Free radical generators such as organic peroxides or azo compounds, as well as UV sensitizers and other polymerization aids, can optionally be added to the polymer composition.

The aluminum-nitrogen polymer compositions according to the present invention can additionally contain fillers. Suitable fillers include, for example, $SiO_2$, $Si_3N_4$, AlN, BN, $B_4C$, $Al_2O_3$, $B_2O_3$, TiN, TiC, $ZrO_2$, Si, Al, ZrC and SiC in the form of a powder, whiskers, or fibers.

An aluminum nitride-containing ceramic is produced by pyrolysis of the crosslinked aluminum-nitrogen polymers in a non-oxidizing atmosphere such as nitrogen or ammonia. Pyrolysis in nitrogen is carried out at from about 800° to about 2200° C., preferably 1200° to 2000° C., and most preferably 1400° to 1700° C. Pyrolysis in ammonia can be accomplished at a temperature as low as about 600° C.

The aluminum-nitrogen polymers of this invention can be used in the preparation of ceramic fibers, films, coatings, and foams; in the infiltration of a preform structure and subsequent pyrolysis to produce a composite aluminum nitride-containing structure, as a thin film for electronic applications or as a binder for ceramic or metal powders.

EXAMPLE 1

A 100 ml Schlenk round bottom flask was fitted with a pressure equalized dropping addition funnel and purged with nitrogen. 3-Butenenitrile (10 ml, 150 mmol) was added to the flask. The funnel was charged with diisobutylaluminum hydride (150 ml), 1.0 M in toluene, 150 mmol) and the flask was cooled to 0° C. The diisobutylaluminum hydride was added dropwise over thirty minutes and stirred at 0° C. for an additional 30 minutes. The solution turned a bright yellow color. The flask was warmed to room temperature and the solution was stirred overnight. The solvent was removed under vacuum leaving 31 g of the aluminum imine $[CH_2\!=\!CHCH_2CH\!=\!NAl(i\text{-}C_4H_9)_2]_2$. The imine was a liquid containing butenyl groups on nitrogen, with a room temperature viscosity similar to that of water.

The aluminum imine was polymerized by heating to 150° C. for 8 hours under a flow of nitrogen. The resulting polymer is a liquid containing butenyl groups on nitrogen, with a viscosity slightly thicker than honey.

EXAMPLE 2

The polymer of Example 1 (0.5 g) was thermally cured heating in nitrogen to 200° C. for 1 hour to form a red brittle solid. The cured polymer retained its shape and did not melt on further heating.

EXAMPLE 3

The polymer of Example 1 (0.34 g) was fired in a mullite tube furnace in an alumina boat to 1500° C. at 10° C./minute in a nitrogen atmosphere. X-ray diffraction of the fired product showed crystalline AlN as the only phase present.

EXAMPLE 4

A 100 ml Schlenk round bottom flask was fitted with pressure equalized dropping addition funnel and purged. Methacrylonitrile (2.5 ml, 29.8 mmol) was added to the flask. The funnel was charged with diisobutylaluminum hydride (29.8 ml, 1.0 M in toluene, 29.8 mmol) and the flask was cooled to 0° C. The diisobutylaluminum hydride was added dropwise over 60 minutes and stirred at 0° C. for 30 minutes. The flask was warmed to room temperature and the yellow solution was stirred overnight. The solvent was removed under vacuum leaving 5.7 g (92%) of light green waxy solid, $[CH_2=C(CH_3)CH=NAl(i-C_4H_9)_2]_2$, which melted at 50° C.

The aluminum imine was polymerized by heating to 140° C. for 4 hours under a flow of nitrogen. The resulting polymer was a black solid containing 2-methylpropenyl groups on nitrogen which melted at 82° C.

EXAMPLE 5

The polymer of Example 4 (2.1 g) was thermally cured heating in nitrogen to 200° C. to form a dark green solid. The cured polymer retained its shape and did not melt on further heating.

EXAMPLE 6

The polymer of Example 1 (1.0 g) was mixed with AlN powder (1.0 g), poured into a mold, and heated to 200° C. under nitrogen to form a rigid, cured molded shape. The AlN-filled molded polymer was fired in a mullite tube furnace in an alumina boat to 1500° C. at 10° C./minute in a nitrogen atmosphere.

EXAMPLE 7

The polymer prepared in Example 1 was brushed onto an aluminum substrate, transferred to a vial, and cured to a solid film by heating to 200° C. under nitrogen.

EXAMPLE 8

This example confirms the loss of organic unsaturation in the crosslinked polymer of Example 2.

The aluminum imine $[CH_2=CHCH_2CH=NAl(i-C_4H_9)_2]_2$ prepared in Example 1, the polymer prepared in Example 1, and the crosslinked polymer of Example 2, were analyzed by Raman spectroscopy and carbon-13 NMR spectroscopy. The Raman data indicate that carbon-carbon double bonds are present in the imine $[CH_2=CHCH_2CH=NAl(i-C_4H_9)_2]_2$, and in the polymer of Example 1 as determined by the presence of bands in the C=C region at 1600–1700 cm$^{-1}$. However, no evidence of carbon-carbon double bonds was evident in the crosslinked polymer of Example 2. The carbon-13 NMR data corroborate the Raman results. The carbon-13 spectra of the imine $[CH_2=CHCH_2CH=NAl(i-C_4H_9)_2]_2$ and of the polymer of Example 1 displayed resonances in the δ 120–150 ppm region indicative of C=C bonds. The carbon-13 spectrum of the crosslinked polymer of Example 2 showed no resonances in the δ 120–150 ppm region.

I claim:

1. A crosslinked aluminum-nitrogen polymer prepared by supplying energy a polymer comprising a backbone of alternating aluminum and nitrogen atoms, both having pendant organic groups, wherein at least some of said pendant organic groups are alkenyl or alkynyl groups in an amount and for a time sufficient to crosslink the alkenyl or alkynyl groups.

2. The crosslinked aluminum-nitrogen polymer of claim 1 wherein the energy supplied comprises heat.

3. An aluminum nitride-containing ceramic formed by pyrolyzing the crosslinked aluminum-nitrogen polymer of claim 1 in a non-oxidizing atmosphere.

4. The crosslinked aluminum-nitrogen polymer of claim 1 which additionally comprises at least one filler.

5. The cross-linked aluminum-nitrogen polymer of claim 4, wherein said at least one filler comprises at least one material selected from the group consisting of SiO$_2$, Si$_3$N$_4$, AlN, BN, B$_4$C, Al$_2$O$_3$, B$_2$O$_3$, TiN, TiC, ZrO$_2$, Si, Al, Zrc and SiC.

6. The crosslinked aluminum-nitrogen polymer of claim 4 wherein said at least one filler comprises silicon carbide.

7. The crosslinked aluminum-nitrogen polymer of claim 5 wherein said at least one filler comprises aluminum nitride.

8. The crosslinked aluminum-nitrogen polymer of claim 4, wherein said at least one filler comprises at least one form selected from the group consisting of powders, whiskers and fibers.

9. A method of using the cross-linked aluminum-nitrogen polymer of claim 1, wherein said polymer is infiltrated into a preform structure and pyrolyzed to produce a composite aluminum nitride-containing structure.

* * * * *